AUTOMATIC ADJUSTING SYSTEM OF TUNED AMPLIFIER

Filed Aug. 23, 1965 2 Sheets-Sheet 1

$$\frac{1}{\int_{fa}^{foi} G(fo_1, fo_2, fo_3, qo_1, qo_2, qo_3, f)\,df}$$

$$-\frac{1}{\int_{foi}^{fb} G(fo_1, fo_2, fo_3, qo_1, qo_2, qo_3, f)\,df}$$

INVENTOR
Kazutsugu Kobayashi

BY Stevens, Davis, Miller & Mosher

ATTORNEYS

AUTOMATIC ADJUSTING SYSTEM OF TUNED AMPLIFIER

Filed Aug. 23, 1965 2 Sheets-Sheet 2

INVENTOR

Kazutsugu Kobayashi

BY Stevens, Davis, Miller & Mosher

ATTORNEYS

United States Patent Office 3,405,365

Patented Oct. 8, 1968

3,405,365

AUTOMATIC ADJUSTING SYSTEM OF TUNED AMPLIFIER

Kazutsugu Kobayashi, Kadoma-shi, Japan, assignor to Matsushita Electric Industrial Co., Ltd., Osaka, Japan, a corporation of Japan Filed Aug. 23, 1965, Ser. No. 481,571
Claims priority, application Japan, Aug. 29, 1964, 39/49,576; Aug. 31, 1964, 39/50,071, 39/50,072
8 Claims. (Cl. 330—2)

ABSTRACT OF THE DISCLOSURE

An automatic system for adjusting gain-frequency characteristic comprising a sampling signal generating means, an adjusted amplifier, filter means, rectifying and smoothing means, adding means, power amplifier, and electro-mechanical transducers, and voltage adjuster means. The sampling signal generating means supplies a sampling signal to the input of the adjusted amplifier. The output of the adjusted amplifier is decomposed into sampling frequency components by the filter means and fed to the rectifying and smoothing means through the voltage adjusting means or directly and normalized gain-frequency characteristic sample signals or gain-frequency characteristic sample signals are obtained. The adding means are fed by the output of the rectifying and smoothing means to transform the normalized gain-frequency characteristic sample signals or gain-frequency characteristic sample signals into adjusting signal voltages. The power amplifiers amplify the adjusting signal voltages and drive the electro-mechanical transducers which vary the adjusting variables of the adjusted amplifier simultaneously and enable high speed, high precision adjustment.

This invention relates to automatic adjusting systems for adjusting gain-frequency characteristics of tuned amplifiers such as single-tuned, double-tuned, stagger-tuned and stagger damped double-tuned amplifiers. These amplifiers are generally used as intermediate frequency amplifiers in radio equipment. Such amplifiers always require the adjustment of gain-frequency characteristic after assembling. These adjustments are generally carried out by a skilled operator. On the other hand, the automatic assembling technique of electronic devices has been developed in recent years. When equipment is assembled automatically, it is more profitable to automate the adjusting process.

Therefore, an object of the present invention is to provide a system which adjusts the gain-frequency characteristic of tuned amplifiers contained in many kinds of electronic equipment.

Another object of the present invention is to provide a system of adjusting the gain-frequency characteristic of tuned amplifiers, which adjusts them without any connection that may disturb the characteristic with respect to the intermediate circuits. It will be easy to develop an adjusting system for adjusting stage by stage and obtaining an overall characteristic fairly close to the standard one. But this method is not profitable because this method cannot be applied without any disturbances on the circuits of the amplifier being adjusted, since it is required, in such systems, to connect the adjusting system to the intermediate stages of the amplifier being adjusted. Such a disturbance interrupts the precise adjustment of the gain-frequency characteristic.

A further object of the present invention is to provide a system which adjusts the overall gain-frequency characteristic to the standard in a manner similar to the performance of a human adjuster.

A further object of the present invention is to provide a system of adjusting gain-frequency characteristics of tuned amplifiers which will not adversely affect the amplifier even when the absolute gain of the amplifier differs from its standard value.

A further object of the present invention is to provide a system of adjusting gain-frequency characteristics of tuned amplifiers, which has sufficient stability in its operation by employing a negative feedback control technique.

Another object of the present invention is to provide a system of adjusting gain-frequency characteristics of tuned amplifiers in which the terminations of the adjustments correspond to the arrival of the system at the stable equilibrium state.

Another object of the present invention is to provide a system of adjusting gain-frequency characteristics of tuned amplifiers, which has very high adjusting speed by simultaneously adjusting all of the adjusting variables which affect the gain-frequency characteristic of the amplifier being adjusted.

Another object of the present invention is to provide a system for adjusting gain-frequency characteristics of tuned amplifiers, which has simple construction and high reliability.

Another object of the present invention is to provide a system for adjusting gain-frequency characteristics of tuned amplifiers, which has high adjusting precision in spite of simple construction.

Another object of the present invention is to provide a system for adjusting gain-frequency characteristics of tuned amplifiers, in which the setting of the standard gain-frequency characteristic is very easy.

Another object of the present invention is to provide a system for adjusting gain-frequency characteristics of tuned amplifiers, which can be installed by conventional construction means for the purpose of low constructing cost.

In order to achieve these objects, exemplary systems according to the present invention are designed as set forth in the annexed claims and apparent from the following description of the adjusting systems exemplified by the block diagrams shown in FIG. 5 and FIG. 7.

The above will be more clearly understood with reference to the accompanying drawings, wherein.

This invention is, briefly, to provide a system of adjusting the gain-frequency characteristics of tuned amplifiers by detecting the gain-frequency characteristic of the amplifier being adjusted, making a transformation on it, obtaining several values from it, using them as the adjusting signals, driving the adjusting variables according to these signals by power amplifiers and actuators such as electro-mechanical transducers. Therefore this adjusting system is closed loop feedback system. It will not be difficult to devise an adjusting system of the tuned amplifiers by means of stage by stage adjustment, though this method is not profitable because of its disturbance on intermediate circuits which will reduce the accuracy of adjustment.

But this invention quite differs from the procedure of stage by stage adjustment. Therefore, at the outset, the fundamental principle of this invention will be explained.

Figures 1, 4:
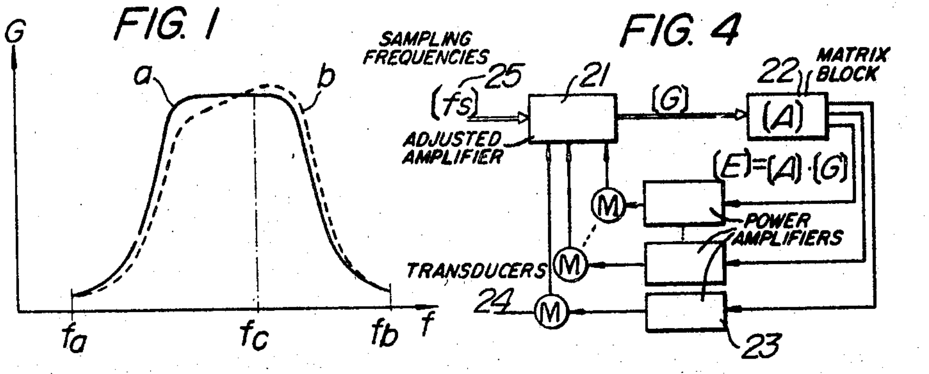
FIG. 1 illustrates the principle of the invention.
FIG. 4 is the block diagram illustrating the principle employing sampling technique.
Figure 2:
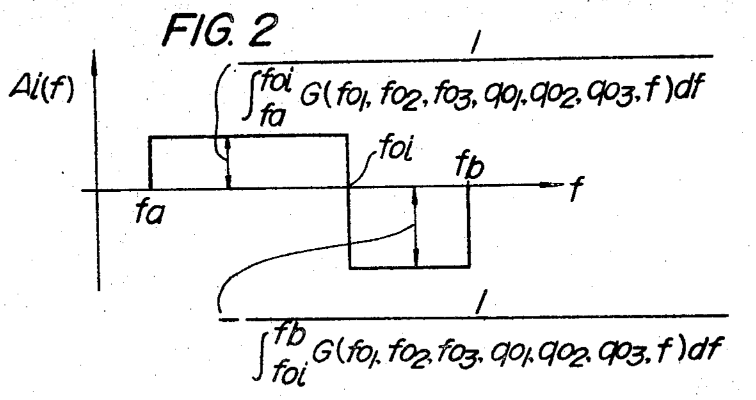
FIG. 2 illustrates one of the adjusting functions of the principle.

Referring now to FIG. 1 of the drawings, the curves $a$ and $b$ illustrate gain-frequency characteristics of a tuned band pass amplifier. For the purpose of making the explanation clear, the subject amplifier is supposed to be a three-stage stagger tuned amplifier. However, this does not reduce the scope of this principle. Let the gain-frequency characteristic of the amplifier be $G\{q_1, q_2, q_3, fr_1, fr_2, fr_3, f\}$; where $fr_1$, $fr_2$ and $fr_3$ are the resonance frequencies of the resonance circuits of each stage, $q_1$, $q_2$ and $q_3$ are the so-called "Q" or the quality factors of the resonance circuits of each stage.

In FIG. 1, curve $a$ is the standard characteristic and $b$ is a slightly different characteristic curve from the standard one. The standard characteristic corresponds to the case in which the resonance frequencies $fr_i$ of each stage are equal to $fo_i$, $i=1, 2, 3$, and the quality factors $q_i$ of each stage are equal to $qo_i$, $i=1, 2, 3$, which are designed for the standard gain-frequency characteristic of the amplifier. Therefore, we may write the standard characteristic as $G_0\{qo_1, qo_2, qo_3, fo_1, fo_2, fo_3, f\}$. Various gain-frequency characteristics have to be adjusted to this standard characteristic. The information necessary for the adjustment are the directions and the magnitude of shifting each resonance frequency for making various characteristics close to the standard one. Now this invention provides a method of obtaining the information without any measurements on resonance frequencies, and after shifting each resonance frequency according to this information, the gain-frequency characteristic of the amplifier converges to the standard one. The procedure of deriving this information is as follows; let $f_a$ and $f_b$ be the lower bound frequency and upper bound frequency of adjusting frequency region, and take a frequency $f_c$ in this frequency region. Then the area enclosed by the gain-frequency characteristic curve, frequency axis, and frequency $f_a$ and $f_c$, and the area enclosed by gain-frequency characteristic curve, frequency axis, and frequency $f_c$ and $f_b$ vary their value according to the variations in resonance frequencies. When the resonance frequency of some stage increases, then the ratio of the former area divided by later area become smaller than the original value. If the original state is chosen to the standard characteristic, then a measure of the deviation of the gain-frequency characteristic from the standard one is obtained. It is more available to introduce the value E as follows for the measure;

$$E=\frac{\int_{f_a}^{f_c} G\{qo_1, qo_2, qo_3, fr_1, fr_2, fr_3, f\}df}{\int_{f_a}^{f_c} G_o\{qo_1, qo_2, qo_3, fo_1, fo_2, fo_3, f\}df}-\frac{\int_{f_c}^{f_b} G\{qo_1, qo_2, qo_3, fr_1, fr_2, fr_3, f\}df}{\int_{f_c}^{f_b} G_o\{qo_1, qo_2, qo_3, fo_1, fo_2, fo_3, f\}df} \quad (1)$$

If the gain-frequency characteristic is the standard one, the value of the function E is zero. When a resonance frequency of some stage is increased, then the value of the function E is negative. When the resonance frequency is decreased, then the value is positive. Therefore, this function can be utilized for an adjusting signal. There are, however, three adjusting variables in this example. It is not profitable to vary three variables by only one value E. There should be three values for adjusting three variables. In deriving three variables for varying three adjusting variables, it is important to reduce the correlations existing in those variables. On the other hand, the variation of the value of the function E in the vicinity of $E=0$ is most extreme in the case when one of the resonance frequencies, $fr_1$ for instance, is varied from the value corresponding to the standard characteristic, $fo_1$ for instance, while others remain without subjecting disturbances, and the bound frequency $f_c$ is arranged equal to the previous resonance frequency corresponding to the standard characteristic, $fo_1$ for instance. It is also noteworthy that the functions obtained as the above have comparatively small correlations with each other. Therefore, it is reasonable to utilize the value $E_i$ which is given by Equation 2 which is obtained by replacing $f_c$ by $fo_i$ in Equation 1.

$$E_i=\frac{\int_{f_a}^{f_{oi}} G\{qo_1, qo_2, qo_3, fr_1, fr_2, fr_3, f\}df}{\int_{f_a}^{f_{oi}} G_o\{qo_1, qo_2, qo_3, fo_1, fo_2, fo_3, f\}df}-\frac{\int_{f_{oi}}^{f_b} G\{qo_1, qo_2, qo_3, fr_1, fr_2, fr_3, f\}df}{\int_{f_{oi}}^{f_b} G_o\{qo_1, qo_2, qo_3, fo_1, fo_2, fo_3, f\}df}$$

where $i=1$, 2 and 3. (2)

Each $E_i$ is, of course, a function of all resonance frequencies, though the interferences in each other are not defective for adjustment purposes. When each $E_i$ becomes equal to zero, the gain-frequency characteristic is equal to a standard one.

The Equation 2 is rewritten using step function $U(f)$ as Equation 3;

$$E_i=\int_{f_a}^{f_b}\left\{\frac{U(f-f_a)U(f-f_{oi})}{\int_{f_a}^{f_{oi}} G_o\{qo_1, qo_2, qo_3, fo_1, fo_2, fo_3, f\}df}-\frac{U(f-f_{oi})-U(f-f_b)}{\int_{f_{oi}}^{f_b} G_o\{qo_1, qo_2, qo_3, fo_1, fo_2, fo_3, f\}df}\right\} G\{qo_1, qo_2, qo_3, fr_1, fr_2, fr_3, f\}df \quad (3)$$

where $i=1$, 2 and 3

$$\times U(f)\begin{cases}=1 f\geq 0,\\ =0 f<0.\end{cases}$$

Replacing the first term of the integrand in Equation 3 by $A_i(f)$, the generalized form is obtained as follows;

$$E_i=\int_{f_a}^{f_b} A_i(f)G\{qo_1, qo_2, qo_3, fr_1, fr_2, fr_3, f\}df$$

$$A_i(f)=\frac{U(f-f_a)-U(f-f_{oi})}{\int_{f_a}^{f_{oi}} G_0\{qo_1, qo_2, qo_3, fo_1, fo_2, fo_3, f\}df}-\frac{U(f-f_{oi})-U(f-f_b)}{\int_{f_{oi}}^{f_b} G_o\{qo_1, qo_2, qo_3, fo_1, fo_2, fo_3, f\}df} \quad (4)$$

where $i=1$, 2 and 3.

Starting now again from Equation 4, the most generalized system can be obtained as mentioned hereinafter.

In this system, when quality factors of each stage are not equal to designed values corresponding to the standard characteristic, the state in which all of $E_i$ are equal to zero does not mean that the gain-frequency characteristic is strictly equal to the standard one. However, the difference therebetween is very small.

This system is subject to a constraint that each of the resonance frequencies is required to be not so far from its standard value corresponding to the standard characteristic. However, this will be overcome, for example, with initial arrangement of the resonance frequency of each tuning circuit or rough adjustment of it.

Figure 3:
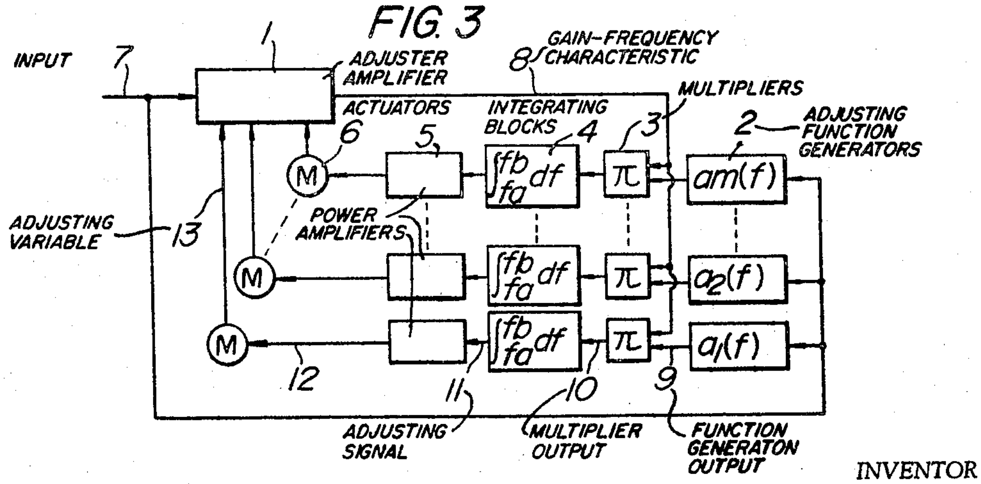
FIG. 3 is the block diagram illustrating the basic principle of the invention.

FIG. 3 shows the block diagram of the generalized system obtained from the foregoing principle. The meaning of the characters used in this drawing, other drawings, following explanation, and following formulae are as follows:

$f$; frequency at the input of the amplifier being adjusted, $fr_i$ ($i=1, 2 \ldots m$); resonance frequency of the resonance circuit of $i$th stage. $m$ is the total number of resonance circuits.

$q_i(i=1, 2 \ldots m)$; quality factor of the resonance circuit of $i$th stage.

$\theta_i(i=1, 2 \ldots m)$; actual adjusting variable of $i$th stage which varies the resonance frequency of the stage. Hitherto, the resonance frequency of $i$th stage $fr_i$ is a function of $\theta_i$. However the actual relation of $fr_i$ with $\theta_i$ differs in each amplifier.

$G\{q_1, q_2 \ldots q_m, fr_1(\theta_1), fr_2(\theta_2) \ldots fr_m(\theta_m), f\}$; the gain frequency characteristic of the amplifier being adjusted showing a function of frequency $f$ including parameters $q_i(i=1, 2 \ldots m)$ and $f_{ri}(i=1, 2 \ldots m)$.

$G_o\{q_{o1}, q_{o2} \ldots q_{om}, f_{o1}(\theta_{o1}), f_{o2}(\theta_{o2}) \ldots f_{om}(\theta_{om}), f\}$; standard gain-frequency characteristic of the amplifier being adjusted.

$f_{oi}(i=1, 2 \ldots m)$; the value of resonance frequency of $i$th stage which forms the standard characteristic together with $q_{oi}$, $i=1, 2 \ldots m$.

$q_{oi}(i=1, 2 \ldots m)$; the value of quality factor of the resonance circuit of $i$th stage which forms the standard characteristic together with $f_{oi}$, $i=1, 2 \ldots m$.

$f_a$, $f_b$; lower bound frequency and upper bound frequency of the adjusting frequency region.

Before explaining FIG. 3 precisely, it is proper to explain blocks therein.

Numeral 1 is the amplifier being adjusted which has input terminal, output terminal and adjusting variables. The adjusting variables are, for example, rotational angles of adjusting screws which vary positions of ferrite cores of tuning inductors and which vary resonance frequencies of resonance circuits.

Numeral 2 indicates the adjusting function generators which give the value $A_i(f)$, $i=1, 2 \ldots m$, according to input $f$.

Numeral 3 indicates multipliers. Each of them multiplies the output gain-frequency characteristic of the amplifier 1 by the output of the function generator 2.

Numeral 4 indicates the integrating blocks. Each of them integrate its input in frequency region $[f_a, f_b]$.

Numeral 5 indicates the power amplifiers which drive actuators 6.

Numeral 6 indicates the actuators such as electromechanical transducers which have the rotational speed proportional to the input voltage.

The input and output of these blocks are as follows:

Numeral 7 is the input of the amplifier block and is, different from actual electric signal, a subset of frequency region $[f_a, f_b]$.

Numeral 8 is the output of the amplifier block which is, different from actual electric signal, the gain frequency characteristic of the amplifier. This is denoted as $G\{q_1, q_2 \ldots q_m, f_{r1}(\theta_1), f_{r2}(\theta_2) \ldots f_{rm}(\theta_m), f\}$.

Numeral 9 indicates the output values of the function generator blocks 2.

The waveform of the output of the weighting and adding circuit depends on the input frequency arrangement. A versatile arrangement of the input frequency is acceptable, though a sweep generator signal is available. When the sweep generator signal is employed, the output of the weighting and adding circuit is a repetition of the waveform of $Ai(f)$.

Numeral 10 indicates the outputs of multiplier blocks 3.

The waveform of the signal output of stage 3 depends on the waveform of the output of the adjusting function generators. The output 8 of the amplifier block is the gain-frequency characteristics which may be obtained by rectifying the output signal caused by the frequency sweep input signal. The output of the multiplier is a time varying voltage value $G \times Ai(f)$ corresponding to the variation in the frequency.

Numeral 11 indicates the outputs of the integrating blocks 4, and the adjusting signals of the system.

Numeral 12 indicates the inputs of the actuators 6 or the outputs of the power amplifiers 5.

Numeral 13 indicates the generalized displacements of actuators such as the rotational angles of servo motors and are denoted by $\theta_1, \theta_2 \ldots \theta_m$.

In FIG. 3 the amplifier being adjusted 1 has the output $G\{q_1, q_2 \ldots q_m, fr_1(\theta_1), fr_2(\theta_2) \ldots fr_m(\theta_m), f\}$, and the subject matter is to drive the adjusting variables 13 so as to make the output approach to the standard characteristic. As previously mentioned, the standard characteristic $G_o\{q_{o1}, q_{o2} \ldots q_{om}, f_{o1}(\theta_{o1}), f_{o2}(\theta_{o2}) \ldots f_{om}(\theta_{om}), f\}$ is realized in the case when the quality factors $q_i$, $i=1, 2 \ldots m$ are equal to $q_{oi}$, $i=1, 2 \ldots m$ and resonance frequencies $fr_i$, $i=1, 2 \ldots m$ are equal to $f_{oi}$, $i=1, 2 \ldots m$. But in actual amplifiers, the quality factors $q_i$ are distributed in the vicinity of $q_{oi}$. When $q_i \neq q_{oi}$, $i=1, 2 \ldots m$ in an amplifier, the gain-frequency characteristic of the amplifier can not be equal to the standard one with any adjustment. Even in such cases, this system reaches to an equilibrium point in which the gain-frequency characteristic is sufficiently close to the standard one. The actual adjusting variables $\theta_i$, $i=1, 2 \ldots m$ are, as formerly mentioned, relating resonance frequencies $f_{ri}$, $i=1, 2 \ldots m$ respectively and $f_{ri}$ can be arranged as a monotone function of $\theta_i$. Under this condition the relations of signs of the velocity of $f_{ri}$ and $\theta_i$ does not change in each of resonance circuits. Clockwise rotation in $\theta_i$, for instance, increases the resonance frequency $f_{ri}$, and counterclockwise rotation decreases it. The most important information in adjusting process is the necessary direction of variation of each resonance frequency so as to get the standard characteristic. This information is presented by the foregoing principle. The value $E_i$ is now used as the shifting speed of adjusting variable $\theta_i$. This leads to a closed loop system which is described by a system of differential Equations 5;

$$\frac{d\theta_i}{dt} = K_i \int_{f_a}^{f_b} A_i(f) \cdot G\{q_1, q_2 \ldots q_m, f_{r1}(\theta_1), f_{r2}(\theta)_2 \ldots f_{rm}(\theta_m), f\} df \tag{5}$$

$i=1, 2 \ldots m$ where $K_i$ is a constant if the response of each actuator 6 is sufficiently high. The function $A_i(f)$, $i=1, 2 \ldots m$ are called adjusting functions and each of them must fulfill two conditions as follows:

$$\text{(i)}: \int_{f_a}^{f_b} A_i(f) \cdot G_0\{q_{01}, q_{02} \ldots q_{0m}, f_{01}(\theta_{01}), f_{02}(\theta_{02}) \ldots f_{0m}(\theta_{0m}), f\} df \equiv 0 \tag{6}$$

$i=1, 2 \ldots m$ (ii): there exists $\epsilon > 0$ such that for every $\epsilon_i$ obeying $|\epsilon_i| < \epsilon$ following inequality holds.

$$\sum_{i=1}^{m} \epsilon_i \int_{f_a}^{f_b} A_i(f) \cdot G\{q_{01}, q_{02} \ldots q_{0m}, f_{r1}(\theta_{01}+\epsilon_1), f_{r2}(\theta_{02}+\epsilon_2) \ldots f_{rm}(\theta_{0m}+\epsilon_m), f\} df < 0 \tag{7}$$

An example of a set of adjusting function $A_i(f)$ satisfying above two constraints is as follows:

$$A_i(f) = \frac{U(f-f_a)-U(f-f_{oi})}{\int_{f_a}^{f_{oi}} G\{q_{o1}, q_{o2} \ldots q_{om}, f_{o1}(\theta_{o1}), f_{o2}(\theta_{o2}) \ldots f_{om}(\theta_{om}), f\} df} \frac{U(f-f_{0i})-U(f-f_b)}{-\int_{f_{oi}}^{f_b} G\{q_{o1}, q_{o2} \ldots q_{om}, f_{o1}(\theta_{o1}), f_{o2}(\theta_{o2}) \ldots f_{om}(\theta_{om}), f\} df} \tag{8}$$

$i=1, 2 \ldots m$ where $U(f)$ is the step function of $f$ as mentioned before;

$$U(f)\begin{cases}=0 & f<0\\ =1 & f\geq 0\end{cases} \tag{9}$$

The Equation 5 is the mathematical expression of this adjusting system and the block diagram representation is shown in FIG. 3.

Referring to FIG. 3, the adjusted amplifier 1 amplifies a subset 7 of frequency region $[f_a, f_b]$, to produce the gain-frequency characteristic as its output and supply them to the multipliers 3. The adjusting function generators 2 produce functions $A_i(f)$, $i=1, 2 \ldots m$ corresponding to their input frequency and supply them to the multipliers 3. The multipliers 3 multiply those inputs and supply them to the integrator blocks 4. The integrator blocks 4 integrate their inputs in the frequency region $[f_a, f_b]$, to produce the adjusting signals 11 and supply them to the power amplifiers 5. The power amplifiers 5 amplify the adjusting signals 11 and drive the actuators 6. The actuators 6 drive the adjusting variables 13 of the adjusted amplifier 1. The adjusting function $A_i(f)$, $i=1, 2 \ldots m$ is based on the standard characteristic $G_o\{q_{o1}, q_{o2} \ldots q_{om}, f_{o1}(\theta_{o1}) \ldots f_{om}(\theta_{om}), f\}$. In other words, the standard characteristic is implicitly contained in the adjusting function $A_i(f)$. The adjusting function $A_i(f)$, $i=1, 2 \ldots m$ achieve the role of reference signal and comparator of feedback control system.

If the gain-frequency characteristic of the adjusted amplifier 1 is different from the standard one, all of the adjusting signals are not equal to zero. Therefore, the actuators 6 vary the adjusting variables 13 corresponding to the adjusting signals 11. If the actuators 6 vary the adjusting variables 13, the gain-frequency characteristic 8 of the adjusted amplifier 1 varies. This closed loop operation makes the gain-frequency characteristic 8 of the adjusted amplifier 1 converge to the standard one. The adjustment terminates corresponding to the state in which all of the adjusting signals 11 are equal to zero. Then the adjusted amplifier 1 is taken out from the system thereby ending the system's closed loop.

Various types of actual systems can be constructed and installed from Equation 5 and the diagram shown in FIG. 3, and examples thereof will be described hereinafter.

A remarkable point of this system is, as previously mentioned, that the adjustment can be carried out without any connections to the intermediate stages of the amplifier being adjusted. This is obvious by foregoing explanation. Another good point of this system is that this system does not operate by the absolute level of amplifier gain, but by the relative gain of the amplifier in various frequency intervals so that the deviation or the difference in absolute gain of the adjusted amplifier has no influence on its final gain-frequency characteristic pattern. This is easily testified as follows:

An amplifier whose gain-frequency characteristic is denoted $G_A\{q_{A1}, q_{A2} \ldots q_{Am}, (f_{r1}), (\theta_{A1}), f_{r2}(\theta_{A2}) \ldots f_{rm}(\theta_{Am}),\}f$ is adjusted and has a final characteristic $G_A\infty\{q_{A1}, q_{A2} \ldots q_{Am}, f_{A1}(\theta_{o1}), f_{A2}(\theta_{o2}) \ldots f_{Am}(\theta_{om}), f\}$. The final characteristic corresponds to the state $d\theta i/dt=0$, $i=1, 2 \ldots m$, so following equations hold;

$$\int_{f_a}^{f_b} A_i(f) G_A\infty\{q_{A1}, q_{A2} \ldots q_{Am}, f_{A1}(\theta_1), f_{A2}(\theta_2) \ldots f_{Am}(\theta_m, f,\}df=0 \tag{10}$$

$$i=1, 2 \ldots m$$

If the characteristic $G_A\infty$ varies to $G_A'\infty$ which is the characteristic pattern similar to $G_A\infty$, then the characteristic $G_A'\infty$ can be denoted $k\times G_A\infty$ using a constant $k$. It is easily shown as follows that such a variation in $G_A\infty$ never affects on equilibrium state:

$$\int_{f_b}^{f_a} A_i(f)\cdot G'_A\infty\{q_{A1}, q_{A2} \ldots q_{Am}, f_{A1}(\theta_{A1}), f_{A2}(\theta_{A2}) \ldots f_{Am}(\theta_{Am}), f\}df$$

$$=\int_{f_b}^{f_a} A_i(f)\cdot k\cdot G_A\infty\{q_{A1}, q_{A2} \ldots q_{AM}, f_{A1}(\theta_{A1}), f_{A2}(\theta_{A2}) \ldots f_{Am}(\theta_{Am}), f\}df$$

$$=f_2\cdot\int_{f_a}^{f_b} A_i(f)\cdot G_A\infty\{q_{A1}, q_{A2} \ldots q_{Am}, f_{A1}(\theta_{A1}), f_{A2}(\theta_{A2}) \ldots f_{Am}(\theta_{Am}), f\}df$$

$$=0,$$

$$I=1, 2 \ldots m \tag{11}$$

Therefore, the equilibrium states in those characteristics are equal.

It is very useful to modify this system into a discrete system in frequency domain or a system of sampled form, because the integration in frequency domain is substituted by summations in the sampling system. In following descriptions, the discrete systems are explained.

Now sampling frequencies $f_{s1}, f_{s2} \ldots f_{sj}$ are chosen in the frequency region $[f_a, f_b]$.

$$f_{sj}: f_a \leq f_{sj} \leq f_b,\ j=1, 2 \ldots n$$

The output of the adjusted amplifier at these sampling frequencies are $G\{q_1, q_2 \ldots q_m, f_{r1}(\theta_1), f_{r2}(\theta_2) \ldots f_{rm}(\theta_m), f_{sj}\}$, $j=1, 2 \ldots n$. In order to make description brief, these values are denoted $g_j$:

$$g_j=g_j, \{q_1, q_2 \ldots q_m, f_{r1}(\theta_1), f_{r2}(\theta) \ldots (f_{rm}(\theta_m)\}$$
$$\equiv G\{q_1\ q_2 \ldots q_m, f_{r1}, (\theta_1), f_{r2}(\theta_2) \ldots f_{rm}(\theta_m), f_{sj}\}$$
$$j=1, 2 \ldots n.$$

Also to the adjusting function $A_i(f)$;

$$a_{ij}=a_i(f_{sj}),$$
$$i=1, 2 \ldots m,$$
$$j=1, 2 \ldots n.$$

Using these values, the equation corresponding to Equation 5 is obtained as follows:

$$\frac{d\theta i}{dt}=k_i\sum_{j=1}^{n} a_{ij} x g_j\{q_1, q_2 \ldots q_m, f_{r1}(\theta_1), f_{r2}(\theta_2) \ldots f_{rm}(\theta_m)$$

$$i=1, 2 \ldots m \tag{12}$$

Equation 12 is rewritten as Equation 13 using matrix notation;

$$\frac{d}{dt}\begin{pmatrix}\theta_1\\ \theta_2\\ \cdot\\ \cdot\\ \cdot\\ \cdot\\ \theta_m\end{pmatrix}=\begin{pmatrix}k_1 & 0 & \cdots & 0\\ 0 & k_2 & & \cdot\\ \cdot & & \cdot & \cdot\\ \cdot & & & \cdot\\ 0 & \cdots & \cdots & k_m\end{pmatrix}\begin{pmatrix}a_{11}, & a_{22}, & \ldots, & a_{1n}\\ a_{21}, & a_{22}, & \ldots, & a_{2n}\\ \cdot & \cdot & & \cdot\\ \cdot & \cdot & & \cdot\\ a_{m1}, & a_{m2}, & \ldots, & a_{mn}\end{pmatrix}\begin{pmatrix}g_1\\ g_2\\ \cdot\\ \cdot\\ \cdot\\ \cdot\\ g_n\end{pmatrix} \tag{13}$$

or $$\frac{d}{dt}[\theta]=[K][A][G] \tag{14}$$

where $$[\theta]=\begin{pmatrix}\theta_1\\ \theta_2\\ \cdot\\ \cdot\\ \theta_m\end{pmatrix}$$

$$[K]=\begin{pmatrix}k_1 & 0 & \cdots & 0\\ 0 & k_2 & & \cdot\\ \cdot & & & \cdot\\ \cdot & & & \cdot\\ 0 & \cdots & \cdots & k_m\end{pmatrix}$$

$$[A]=\begin{bmatrix} a_{11}, a_{12}, \cdots, a_{1n} \\ a_{21}, a_{22}, \cdots, a_{2n} \\ \vdots \\ a_{m1}, a_{m2}, \cdots, a_{mn} \end{bmatrix}$$

$$[G]=\begin{bmatrix} g_1 \\ g_2 \\ \cdot \\ \cdot \\ \cdot \\ g_n \end{bmatrix}$$

As the adjusting functions $A_i(f)$, $i=1, 2 \ldots m$ are restricted by two conditions, this matrix [A] is restricted by following two conditions:

(iii): $[A]\cdot[G_o]=[0]$ (15)

(iv): There exists $\epsilon>0$ such that for every $\epsilon_i$ obeying $|\epsilon_i|<\epsilon$ following inequality holds:

$$[\epsilon]\cdot[A]\cdot[G_\epsilon]<0 \qquad (16)$$

where $$[\epsilon]=[\epsilon_1, \epsilon_2 \ldots \epsilon_m]$$

$$[G_o]=\begin{bmatrix} g_{o1} \\ g_{o2} \\ \cdot \\ \cdot \\ \cdot \\ g_{on} \end{bmatrix}, g_{oj}=G_o\{q_{o1}, q_{o2} \ldots q_{om}), f_{o1}(\theta_{o1}), f_{o2}(\theta_{o2}) \ldots f_{om}(\theta_{om}), f_{sj}\}, i=1, 2 \cdots n$$

$$[G_\epsilon]=\begin{bmatrix} g_{\epsilon1} \\ g_{\epsilon2} \\ \cdot \\ \cdot \\ \cdot \\ g_{\epsilon n} \end{bmatrix}, g_{\epsilon j}=G\{q_{o1}, q_{o2} \ldots q_{om}, f_{r1}(\theta_{o1}+\epsilon_1), f_{r2}(\theta_{o2}+\epsilon_2) \ldots f_{rm}(\theta_{om}+\epsilon_m), f_{sj}\}, i=1, 2 \ldots n$$

Figures 5, 6, 7:
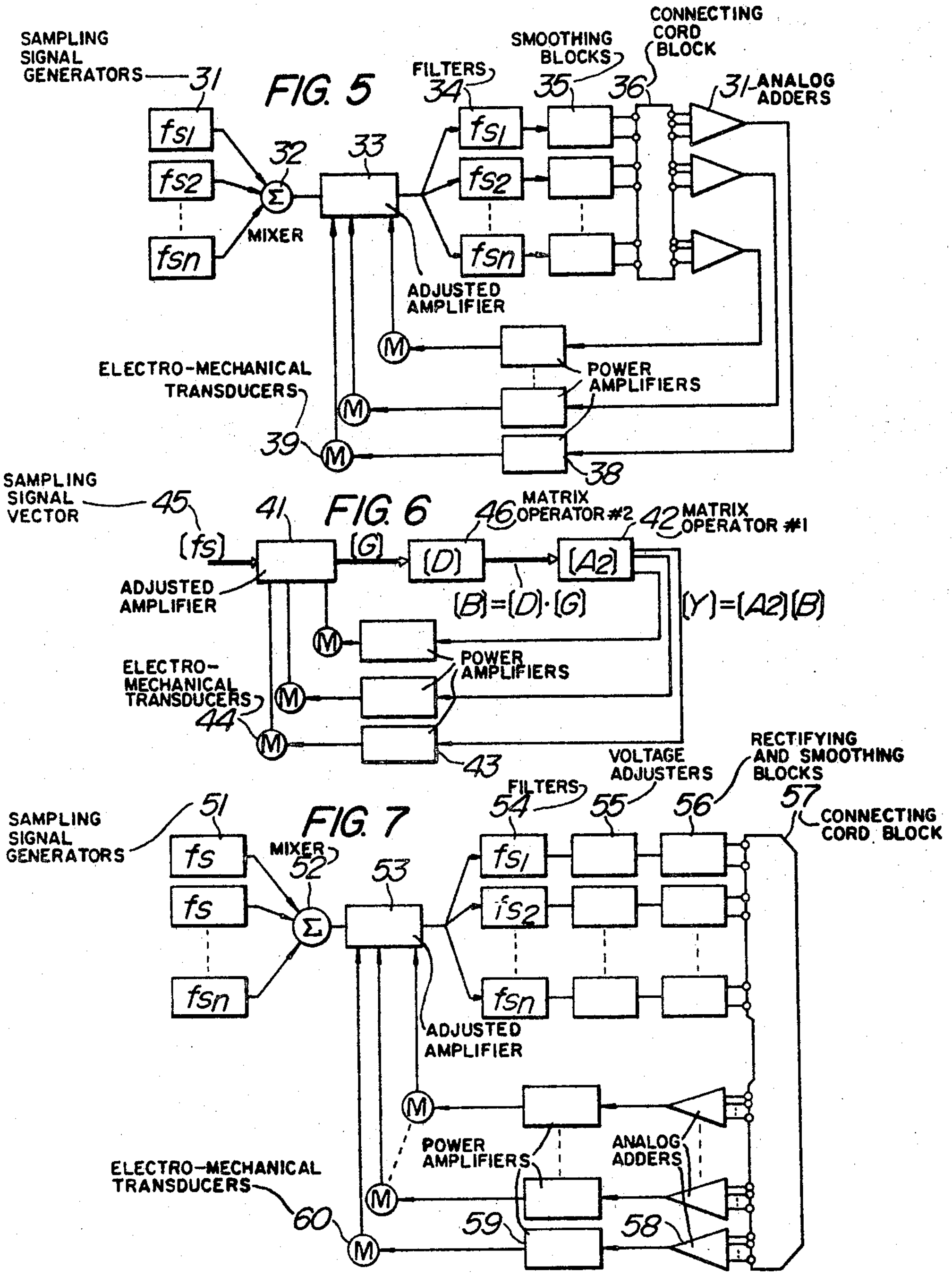
FIG. 5 is the block diagram illustrating an embodiment of the principle exemplified in FIG. 4.
FIG. 6 is the block diagram illustrating a more practical principle of the system employing sampling techniques.
FIG. 7 is the block diagram illustrating an embodiment of the principle exemplified in FIG. 6.

The system constructed from Equations 12 or 13 or 14, 15 and 16 is shown in FIG. 4. This is a theoretical block diagram of this system and an example of its embodiment is shown in FIG. 5.

Each block in FIG. 4 is as follows: Numeral 21 is the amplifier being adjusted, numeral 22 is the matrix block which operates on [G] which is the sample of the output characteristic of the adjusted amplifier 21 and gives the output $[A]\cdot[G]$, numeral 23 indicates a series of power amplifiers which drive electro-mechanical transducers 24 which drive the adjusting screws which vary the adjusting parameters of the adjusted amplifier 21, and numeral 25 is a set of sampling frequencies.

In FIG. 4, the adjusted amplifier 21 amplifies its input sample frequencies and the output is a sample gain-frequency characteristic thereof. The output is called a sample vector and is denoted [G]. This sample vector [G] is transformed into [E] by the matrix block 22. [E] is called an adjusting signal vector. This adjusting signal vector [E] is transmitted through the power amplifier blocks 23 and the electro-mechanical transducers 24 and vary adjusting variables of the amplifier 21 until the adjusting signal vector [E] becomes [0], where [0] is zero vector. When [E] reaches to [0], the gain-frequency characteristic of the adjusted amplifier is very close to the standard characteristic.

$$G_o\{q_{o1}, q_{o2} \ldots q_{om}, f_{o1}(\theta_{o1}), f_{o2}(\theta_{o2}) \ldots f_{om}(\theta_{om}), f\}$$

or the adjustment has been carried out successfully.

In FIG. 5 is shown an example of realizing the theoretical block diagram shown in FIG. 4. In FIG. 5, blocks 31 are sampling signal generators whose oscillating frequencies are equal to the sampling frequencies $f_{sj}$, $j=1, 2 \ldots n$. Each sampling signal generator has an output voltage of the same amplitude. Numeral 32 is a mixer which mixes those sampling signals and presents them to the adjusted amplifier 33. Numeral 33 is the amplifier being adjusted. Numeral 34 indicates filters such as band pass filters or selective amplifiers which decompose the output of the amplifier into the frequencies corresponding to the sampling frequencies. Numeral 35 indicates rectifying and smoothing blocks which rectify the outputs of filters 34 and get the values corresponding to the amplitude of them. Each of the blocks has two output terminals for the purpose of simplifying the realization of the matrix [A] which has positive sign elements and negative sign elements, and one of the terminals gives positive voltage and the other negative. Numeral 38 indicates analog adders which have various coefficients corresponding to the elements of matrix [A]. Numeral 36 is the connecting cord block or terminal strip which connects the inputs of analog adders 37 and the outputs of rectifying and smoothing blocks 35. Numeral 38 indicates the power amplifiers which drive the electro-mechanical transducers 39. Numeral 39 indicates the electro-mechanical transducers which drive the adjusting variables such as the adjusting screws of the adjusted amplifier 33.

In FIG. 5, the adjusted amplifier 33 amplifies the input which includes $n$ sinusoidal voltages having equal amplitude and $n$ individual sampling frequencies. So the output of the amplifier is also a mixture of sinusoidal voltages and each of them has the amplitude corresponding to the gain of the adjusted amplifier 33 at the frequency. This mixture of sinusoidal voltages is decomposed by the filters 34 into respective sinusoidal voltages and each of them is rectified and smoothed by the rectifying and smoothing block 35 in order to get the amplitude information. Then the outputs of the rectifying and smoothing blocks 35 present a set of voltages which represent the gain frequency characteristic of the adjusted amplifier 33. This set of voltages are considered to be the sample of the gain-frequency characteristic of the adjusted amplifier 33. In order to transform this sample into a set of adjusting signals, the matrix [A] is conventionally realized by using analog adders and polarity inverters. However, for the purpose of simplifying it, two output terminals are prepared in each of the rectifying and smoothing blocks 35; one which gives positive voltage is used for positive matrix elements and the other which gives negative voltage is used for negative matrix elements. The value of each element of the matrix [A] varies when the standard characteristic is changed. Some elements change their sign. Therefore, the connection between an input terminal of an analog adder and one of the output terminals of the rectifying and smoothing block 35 must be capable of being changed easily. These connections are prepared in the connecting cord block 36. The connecting cord block 36 contains patch cords each of which achieves the connection between one of a pair of output terminals of the rectifying and smoothing block 35 and one of $n$ input terminals of an analog adder. $m$ analog adders 37 are prepared for the purpose of embodying the matrix [A]. $m$ is the number of the row of the matrix [A]. Each of the analog adders 37 has $n$ input terminals which are connected to the output terminals of the rectifying and smoothing block 35 through the connecting cord block 36. The output of the analog adders 37 are the adjusting signals which drive adjusting variables through the power amplifiers 38 and electro-mechanical transducers 39.

The remarkable feature of this sampled form is that the embodiment of the system is comparatively simple and high adjustment precision is easily obtained.

There is, however, still a point to be improved. In those foregoing adjusting systems, we must rearrange the adjusting functions $A_i(f)$, $i=1, 2 \ldots m$ or the adjusting matrix [A] in every case when we intend to change the standard characteristic of the adjusted amplifier. The rearrangements of adjusting functions or the adjusting matrix require calculations. This is a troublesome feature in actual system. Therefore, the foregoing systems shown in FIG. 4 and FIG. 5 are modified into systems shown in FIG. 6 and FIG. 7. In those systems it is very easy to change the standard characteristic. These systems utilize the normalized gain-frequency characteristic instead of the gain-frequency characteristic itself of the adjusted amplifier. The sample of the gain-frequency characteristic [G] is transformed by the matrix denoted [D], and a normalized sample [B] is obtained as follows:

$$[D]\times[G]=\begin{bmatrix} \frac{1}{g_{o1}},0 \ldots\ldots 0 \\ 0, \frac{1}{g_{o2}}, \quad \cdot \\ \cdot \quad \cdot \quad \cdot \\ \cdot \quad \cdot \quad \cdot \\ \cdot \quad \cdot \ \frac{1}{g_{on}} \\ 0, \ldots\ldots \end{bmatrix}\times[G] = \begin{bmatrix} g_1/g_{o1} \\ g_2/g_{o2} \\ \cdot \\ \cdot \\ \cdot \\ g_n/g_{on} \end{bmatrix}=[B] \quad (17)$$

It is evident, therefore, that $[G]=[G_o]$ corresponds to $[B]=[1]$, where $$[1]=\begin{bmatrix} 1 \\ 1 \\ \cdot \\ \cdot \\ \cdot \\ 1 \end{bmatrix}$$

When this transformation is employed, we must only rearrange the matrix [D] according to the Equation 17 in order to vary the standard characteristic. The adjusting signal vector denoted [Y] is obtained by transforming the normalized sample vector [B] by the matrix $[A_2]$ corresponding to the matrix [A];

$$[Y]=[A_2]\times[B]$$

Matrix $[A_2]$ and matrix [A] satisfy the equation as follows:

$$[A_2]\times[D]=[A] \quad (18)$$

Now that the normalized sample vector become [1] corresponding to the sample of standard characteristic, we should no longer rearrange the adjusting matrix $[A_2]$. This matrix $[A_2]$ is constructed through various examinations and when the optimum one is constructed it is able to use it forever even in the case of changing standard characteristic.

The conditions imposed on the matrix $[A_2]$ are as follows:

$$(v): [A_2]\cdot[1]=[0] \quad (19)$$

where $$[A_2]=\begin{bmatrix} a_{2,11}\ a_{2,12} \cdots a_{2,1n} \\ a_{2,21}\ a_{2,22} \cdots a_{2,2n} \\ \cdot \quad\quad \cdot \\ \cdot \quad\quad \cdot \\ \cdot \quad\quad \cdot \\ a_{2,m1}\ a_{2,m2} \cdots a_{2,mn} \end{bmatrix}$$

(vi): There exists $\epsilon>0$ such that for every $\epsilon_i$ obeying $|\epsilon_i|<\epsilon$ following inequality holds:

$$[\epsilon]\times[A_2]\times[B\epsilon]<0 \quad (20)$$

where $$[\epsilon]=[\epsilon_1, \epsilon_2 \ldots \epsilon_m]$$

$$[B]=[D]\cdot[G_\epsilon]$$

In FIG. 6, the block diagram of this system is represented. The blocks in FIG. 6 are as follows:

Numeral 41 is the amplifier being adjusted; numeral 42 is the matrix operator #1 which operates on input normalized sample vector [B] and generates adjusting signal vector [Y]; and numeral 43 indicates the power amplifiers which amplify the adjusting signals and drive the electro-mechanical transducers 44. Numeral 44 indicates the electro-mechanical transducers which drive the adjusting variables of the adjusted amplifier 41 by the adjusting signals amplified by power amplifiers 43. Numeral 45 is the sampling signal vector, 46 is the matrix operator #2 which normalizes the sample vector of gain-frequency characteristic of the adjusted amplifier.

If the sampling signal vector 45 is applied to the input of the adjusted amplifier 41, the amplifier amplifies its elements according to the gain corresponding to its frequencies. Hence, the output of the adjusted amplifier is considered to be the sample vector [G] of the gain-frequency characteristic of the adjusted amplifier. This sample vector [G] is transformed into normalized sample [B] by the matrix operator #2, 46. The normalized sample vector [B] is applied to the matrix operator #1, 42 obtaining the adjusting signal vector [Y] which is amplified by power amplifiers 43 and drives the electro-mechanical transducer 44 that drives the adjusting variables of the adjusted amplifier 41. The adjusted amplifier has a gain-frequency characteristic different from the standard one before adjustment. If the adjusted amplifier is brought into this system and this system is made a closed loop system, the adjusting variables vary to a set of values which corresponds to the equilibrium point of the closed loop feedback system. The equilibrium point is very close to the corresponding point of the standard characteristic of the adjusted amplifier. Generally, the gain-frequency characteristic of the adjusted amplifier is very close ot the standard one in the state of $[Y]=[0]$.

In FIG. 7, an example of realization of the principle is shown. The blocks therein are as follows: Numeral 51 indicates the sampling signal generators whose oscillating frequencies are sampling frequencies $f_{sj}$, $j=1, 2 \ldots n$. Each of the sampling signal generators has an output voltage of same amplitude. Numeral 52 is the mixer which mixes those sampling signals and supplies the resulting signal to the adjusted amplifier. Numeral 53 is the adjusted amplifier. Numeral 54 are filters such as the band pass filters or selective amplifiers which decompose the output signal of the adjusted amplifier 53 into the frequencies corresponding to the sampling frequencies. Numeral 55 indicates voltage adjusters which are a realization of the matrix [D]. Each of the voltage adjusters 55 amplifies or attenuates the output of each of the filters 54 by factor $1/g_{oi}$, where $i$ corresponds to a number of the $i$th output of the filters 55. Numeral 56 indicates the rectifying and smoothing blocks which rectify and smooth the A.C. voltages transmitted through the filters 54 and the voltage adjuster 55, and get the amplitude informations thereof. Each of the rectifying and smoothing blocks have two output terminals for the purpose of simplifying the realization of the matrix $[A_2]$ which has positive sign elements and negative sign elements. One of the terminals of each block gives positive voltage and the other negative. The value of each element of the matrix $[A_2]$ varies when the standard characteristic is widely changed. Some elements change their sign. Therefore, the connection between an input terminal of an analog adder and one of the output terminals of the rectifying and smoothing block 56 must be capable of being changed easily. These connections are to the connecting cord block or terminal strip 57. The connecting cord block 57 contains patch cords each of which achieves the connection between one of a pair of output terminals of the rectifying and smoothing block 56 and one of $n$ input terminals of an analog adder. $m$ analog adders 58 are prepared for the purpose of embodying the matrix $[A_2]$. $m$ is the number of the row of the matrix $[A_2]$. Each of the analog adders 58 has $n$ inputs which are connected to the output terminals of the rectifying and smoothing block 56 through the connecting cord block 57. Numeral 59 indicates the power amplifiers which drive the electro-mechanical transducers 60. Numeral 60 indicates the electro-mechanical transducers which drive the adjusting variables of the adjusted amplifier 53.

Referring now to FIG. 7, the sampling signal generators 51 generate a set of sampling signals having equal amplitude and individual frequency $f_{sj}$, $j=1, 2 \ldots n$. These sampling signals are mixed by the mixer 52, and the output of the mixer 52 is supplied to the adjusted amplifier 53. The adjusted amplifier 53 gets the sampling frequency sinusoids of equal amplitude as its input, and amplifies them according to the gain of each sampling frequency. Hence, the output of the adjusted amplifier 53 is a mixture of sinusoidal voltages whose amplitudes correspond to the frequencies. Therefore, separating the output of the adjusted amplifier 53 into sampling frequency components by the filters 54 whose center frequencies are equal to the sampling frequencies, a set of sinusoidal voltages which represents the gain-frequency characteristic of the adjusted amplifier are obtained. These sinusoidal voltages are normalized by the voltage adjusters 55 according to the Equation 17. These normalized sinusoidal voltages are rectified and smoothed by rectifying and smoothing blocks 56 obtaining the D.C. voltages which represent the normalized sample vector of the gain-frequency characteristic of the adjusted amplifier. In order to transform this normalized sample vector into the adjusting signal vector, the matrix $[A_2]$ is generally realized by analog adders and polarity inverters. However, for the purpose of simplifying it, two terminals are prepared in each of the rectifying and smoothing blocks; one of the terminals which gives positive voltage is utilized for positive matrix elements and the other which gives negative voltage is utilized for negative matrix elements. The connections of these blocks with analog adders 58 are accomplished by the connecting cord blocks 57 according to the matrix $[A_2]$. The outputs of the analog adders 58 are the adjusting signal vectors which drive adjusting variables through the power amplifiers 59 and electromechanical transducers 60.

The remarkable feature of this sampled form employing normalization is that the alternation of the standard gain-frequency characteristic is very easy in comparison with the previous simple sampled form. Now the procedure of setting the standard characteristic is to separate the connections between adjusting variables and electromechanical transducers, to bring an amplifier which has the standard gain-frequency characteristic into the system, and to adjust each of voltage adjusters 55 so that the output voltages of rectifying and smoothing blocks 56 may give equal value for the amplifier.

The embodiments of the invention in which an exclusive properties or privilege is claimed are defined as follows:

What is claimed is:

1. A system of adjusting gain-frequency characteristics of a tuned amplifier comprising a sampling signal generating means, said sampling signal generating means generating a plurality of sampling frequencies; an adjusted amplifier which undergoes the adjustment and has an input, an output and adjusting variables which vary the gain-frequency characteristics of said adjusted amplifier, said input of said adjusted amplifier being fed by an output of said sampling signal generating means; filter means, said filter means being fed by said output of said adjusted amplifier and decomposing said output into sampling frequency components; rectifying and smoothing means, said rectifying and smoothing means being fed by said filter means and providing amplitude informations of said sampling frequency components at the output thereof; adding means, each of said adding means being fed by the output of said rectifying and smoothing means and transforming said amplitude informations into adjusting signal voltages; power amplifiers, said power amplifiers being fed by the output of said adding means and amplifying said adjusting signal voltages; electro-mechanical transducers, said electro-mechanical transducers being fed by said power amplifiers and varying said adjusting variables.

2. A system of adjusting gain-frequency characteristics of a tuned amplifier as claimed in claim 1, wherein said sampling signal generator comprises a plurality of sinusoidal voltage oscillators and a mixer means.

3. A system of adjusting gain-frequency characteristics of a tuned amplifier as claimed in claim 1, wherein each of said rectifying and smoothing means provides a positive voltage output and a negative voltage output.

4. A system of adjusting gain-frequency characteristics of a tuned amplifier as claimed in claim 3, wherein said system further includes a connecting cord block means, said connecting cord block means connecting said output of said rectifying and smoothing means and inputs of adding means, said connection being easily changed.

5. A system of adjusting gain-frequency characteristics of a tuned amplifier comprising a sampling signal generating means, said sampling signal generating means generating a plurality of sampling frequencies; an adjusted amplifier which undergoes the adjustment and has an input, an output and adjusting variables which vary the gain-frequency characteristic of said adjusted amplifier, said input of said adjusted amplifier being fed by an output of sampling signal generating means; filter means, said filter means being fed by said output of said adjusted amplifier and decomposing said output into sampling frequency components; voltage adjuster means, said voltage adjuster means being fed by the output of said filter means, each of said voltage adjuster means having a predetermined transmission gain and providing a normalized sampling frequency component; rectifying and smoothing means, said rectifying and smoothing means being fed by said voltage adjuster means and providing amplitude information of said normalized sampling frequency components; adding means, each of said adding means being fed by the output of said rectifying and smoothing means and transforming said amplitude information into adjusting signal voltages; power amplifiers, said power amplifiers being fed by the output of said adding means and amplifying said adjusting signal voltages; electro-mechanical transducers, said electro-mechanical transducers being fed by said power amplifiers and being operatively connected to vary said adjusting variables.

6. A system of adjusting gain-frequency characteristics of a tuned amplifier as claimed in claim 5, wherein said sampling signal generator comprises a plurality of sinusoidal voltage oscillators and a mixer means.

7. A system of adjusting gain-frequency characteristics of a tuned amplifier as claimed in claim 5, wherein each of said rectifying and smoothing means provides a positive voltage output and a negative voltage output.

8. A system of adjusting gain-frequency characteristics of a tuned amplifier as claimed in claim 7, wherein said system further includes connecting cord block means, said connecting cord block means connecting said outputs of said rectifying and smoothing means and inputs of adding means by easily changeable connections.

References Cited

UNITED STATES PATENTS

| | | | |
|---|---|---|---|
| 2,251,064 | 7/1941 | Martin et al. | 334—28 |
| 2,843,747 | 7/1958 | Ashley | 330—2 X |
| 2,978,655 | 4/1961 | Fernsler | 330—2 X |
| 2,978,646 | 4/1961 | Saumard | 330—154 X |
| 2,978,647 | 4/1961 | Lehmann | 330—154 X |

ROY LAKE, *Primary Examiner.*

J. B. MULLINS, *Assistant Examiner.*